United States Patent
Sun et al.

(10) Patent No.: US 8,699,644 B1
(45) Date of Patent: Apr. 15, 2014

(54) ADAPTIVE LOW-COMPLEXITY CHANNEL ESTIMATION

(75) Inventors: Yakun Sun, Sunnyvale, CA (US);
Jiwoong Choi, Sunnyvale, CA (US);
Hui-Ling Lou, Sunnyvale, CA (US);
Rapheal Cendrillon, Palo Alto, CA (US)

(73) Assignee: Marvell International Ltd. (BM)

( * ) Notice: Subject to any disclaimer, the term of this patent is extended or adjusted under 35 U.S.C. 154(b) by 191 days.

(21) Appl. No.: 13/282,952

(22) Filed: Oct. 27, 2011

Related U.S. Application Data (60) Provisional application No. 61/407,692, filed on Oct. 28, 2010.

(51) Int. Cl.
*H04B 1/10* (2006.01)
(52) U.S. Cl.
USPC .......................... 375/349; 375/340; 370/206
(58) Field of Classification Search
USPC ......... 375/224, 227–228, 259–260, 285, 316, 375/340, 346, 349; 370/206, 210
See application file for complete search history.

(56) References Cited

U.S. PATENT DOCUMENTS

| | | | |
|---|---|---|---|
| 7,689,242 B2 | 3/2010 | Stirling-Gallacher et al. | |
| 7,778,362 B2 | 8/2010 | Shor | |
| 2002/0034161 A1* | 3/2002 | Deneire et al. | 370/210 |
| 2007/0070179 A1* | 3/2007 | van Rooyen | 348/14.02 |
| 2007/0110172 A1* | 5/2007 | Faulkner et al. | 375/260 |
| 2009/0041087 A1* | 2/2009 | Yamasuge | 375/130 |
| 2012/0084621 A1* | 4/2012 | Hong et al. | 714/755 |
| 2012/0115520 A1* | 5/2012 | Rossel et al. | 455/501 |

OTHER PUBLICATIONS

Yushi Shen and Ed Martinez, "Channel Estimation of OFDM Systems" from Freescale Semiconductor Inc., Application Note AN3059, Rev. 0, Jan. 2006 (16 pgs).

* cited by examiner

*Primary Examiner* — Jean B Corrielus (57) ABSTRACT

Systems, methods, and other embodiments associated with adaptive low-complexity channel estimation are illustrated. In one embodiment a device includes a receiver configured to receive an orthogonal frequency-division multiplexed (OFDM) signal. The device also includes a controller configured to control a switch to select between processing paths based, at least in part, on the channel conditions of the OFDM signal. The processing paths selectable by the switch include a first processing path and a second processing path.

17 Claims, 6 Drawing Sheets

ADAPTIVE LOW-COMPLEXITY CHANNEL ESTIMATION

CROSS REFERENCE TO RELATED APPLICATIONS

This patent disclosure claims the benefit of U.S. provisional application Ser. No. 61/407,692 filed on Oct. 28, 2010, which is hereby incorporated by reference in its entirety.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Orthogonal frequency-division multiplexing (OFDM) is a signal modulation technique often used with wireless communications and some wired communications. OFDM offers high transmission rates and, thus, is beneficial for use in data networks. However, several difficulties may be encountered when attempting to efficiently process OFDM signals in a receiver. For example, processing an OFDM signal according to a two-dimensional technique, while efficient is overly complex for most implementations. Thus, a trade off for a less complex processing solution may be implemented. In one example, this may include one-dimensional processing techniques. However, one-dimensional processing can suffer from processing inefficiencies. Processing inefficiencies for a one-dimensional technique arise when conditions associated with an OFDM signal fall outside of an operational range for an implemented solution. Thus as conditions of the OFDM signal change, processing efficiency can be significantly reduced.

For example, consider a wireless network interface card (NIC) that uses a low complexity solution to process an OFDM signal received from a wireless access point. Typically, the low complexity solution is tuned to perform well for a specific set of operating conditions (e.g., slowly changing frequency selectivity). Thus, when the operating conditions fall outside of the tuned operation conditions (e.g., quickly changing frequency selectivity), processing becomes inefficient and system performance suffers.

SUMMARY

In one embodiment a device includes a receiver configured to receive an orthogonal frequency-division multiplexed (OFDM) signal. The device includes a measurement logic configured to determine channel conditions of the OFDM signal. The device also includes a controller configured to control a switch to select between processing paths based, at least in part, on the channel conditions of the OFDM signal. The processing paths selectable by the switch include a first processing path and a second processing path. The first processing path processes the OFDM signal first in the frequency domain and then subsequently processed in the time domain. The second processing path processes the OFDM signal first in the time domain and then subsequently processed in the frequency domain.

In another embodiment a method includes receiving an OFDM signal in a communication device. The method includes determining channel conditions from the OFDM signal. The method also includes controlling the communication device to select between processing paths for performing successive one-dimensional processing of the OFDM signal based, at least in part, on the channel conditions of the OFDM signal. The processing paths include a first processing path and a second processing path. The first processing path is to process the OFDM signal first in the frequency domain and subsequently in the time domain. The second processing path is to process the OFDM signal first in the time domain and subsequently in the frequency domain.

In another embodiment, an integrated circuit includes a receiver configured to receive an orthogonal frequency-division multiplexed (OFDM) signal to be processed according to a successive one-dimensional processing path. The integrated circuit includes a measurement logic configured to determine channel conditions of the OFDM signal. The integrated circuit also includes a controller configured to control a switch to select between processing paths based, at least in part, on the channel conditions of the OFDM signal. The processing paths selectable by the switch include a first processing path and a second processing path. The first processing path is configured to process the OFDM signal first in a frequency domain and subsequently in a time domain. The second processing path is configured to process the OFDM signal first in the time domain and subsequently in the frequency domain.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some embodiments, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are systems, methods, and other embodiments associated with adaptive, low-complexity channel estimation for processing an orthogonal frequency-division multiplexing (OFDM) signal. In one embodiment, a communications device adaptively switches between different processing circuits depending on dynamic conditions of the OFDM signal. In this way, processing efficiency for the OFDM signal may be maintained as channel conditions for the OFDM signal change.

Figure 1:
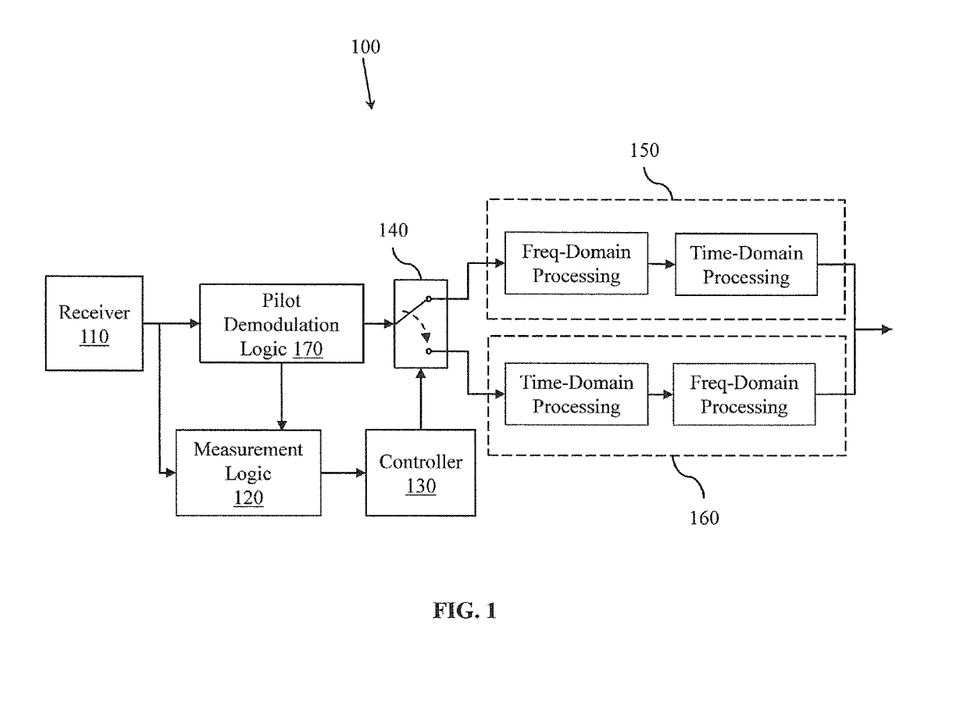
FIG. 1 illustrates one embodiment of a device associated with adaptive low-complexity channel estimation.

FIG. 1 illustrates one embodiment of a device 100 associated with adaptive, low-complexity channel estimation. The device 100 includes a receiver 110, a measurement logic 120, a switch controller 130, and a switch 140. The device 100 may also include a first processing path 150, a second processing path 160, and a pilot demodulation logic 170. In the embodiment shown in FIG. 1, the first processing path 150 is configured to first perform frequency-domain processing followed by time-domain processing, and the second processing path 160 is configured to first perform time-domain processing followed by frequency-domain processing.

Figure 2:
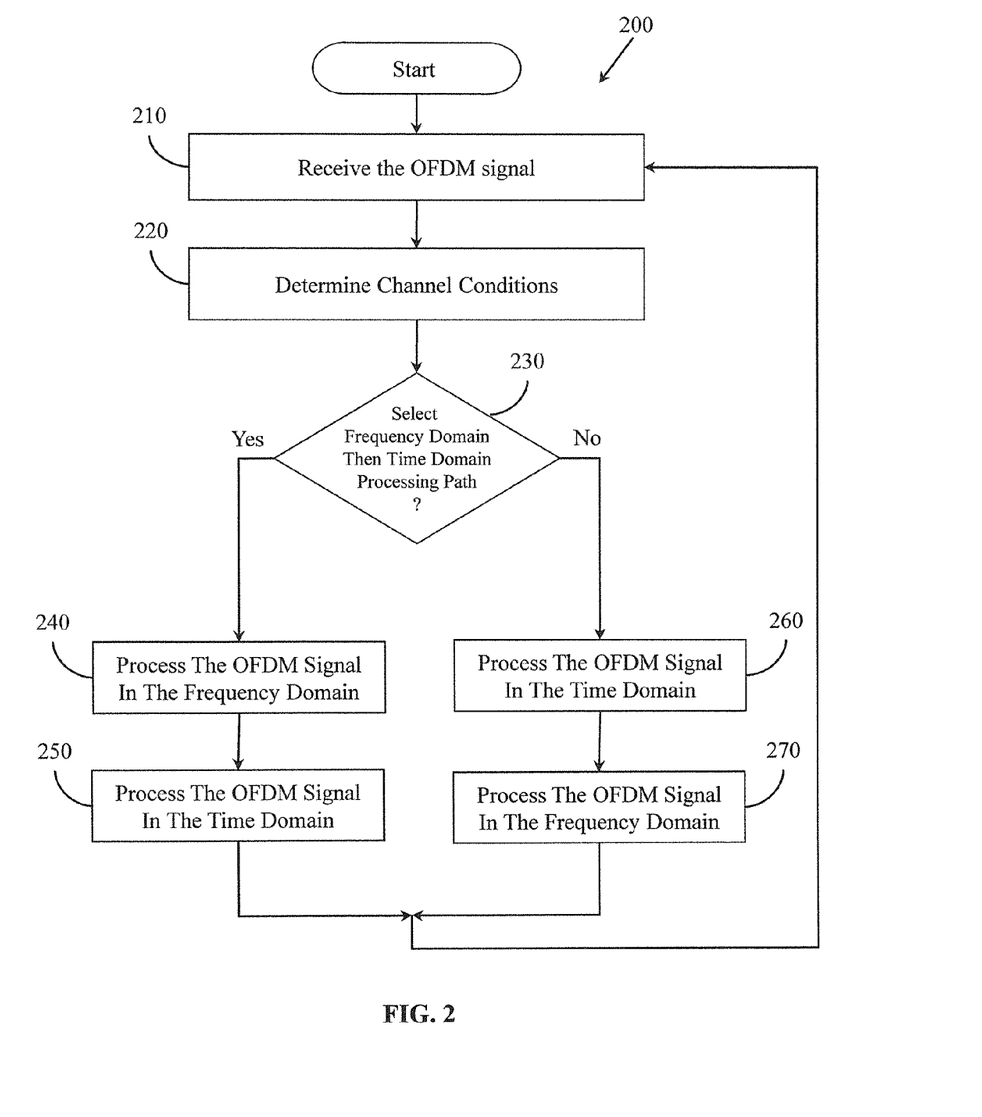
FIG. 2 illustrates one embodiment of a method associated with adaptive low-complexity channel estimation.

FIG. 1 will be discussed in greater detail in conjunction with FIG. 2. FIG. 2 illustrates one embodiment of a method 200 associated with adaptive, low-complexity channel estimation. FIG. 2 is discussed from the perspective that the method 200 is implemented and performed by the device 100 to adaptively control the switch 140 to select a processing path—e.g., the first processing path 150 or the second processing path 160—based, at least in part, on channel conditions for an OFDM signal.

At 210, the receiver 110 receives an orthogonal frequency-division multiplexed (OFDM) signal. In one example, the OFDM signal is a wireless communication sent from a transmitting device to the device 100. The device 100 can be, for example, a wireless communications device that is compatible with IEEE 802.16, $3^{rd}$ Generation Partnership Project Long Term Evolution (LTE), IEEE 802.11, and so on. Additionally, the device 100 can be, for example, a cellular phone, a smartphone, a handheld device, a wireless network interface card (NIC), and so on. Wired medium communication techniques including, for example, Digital Subscriber Line (DSL) technology may also use OFDM transmissions.

Figure 3:
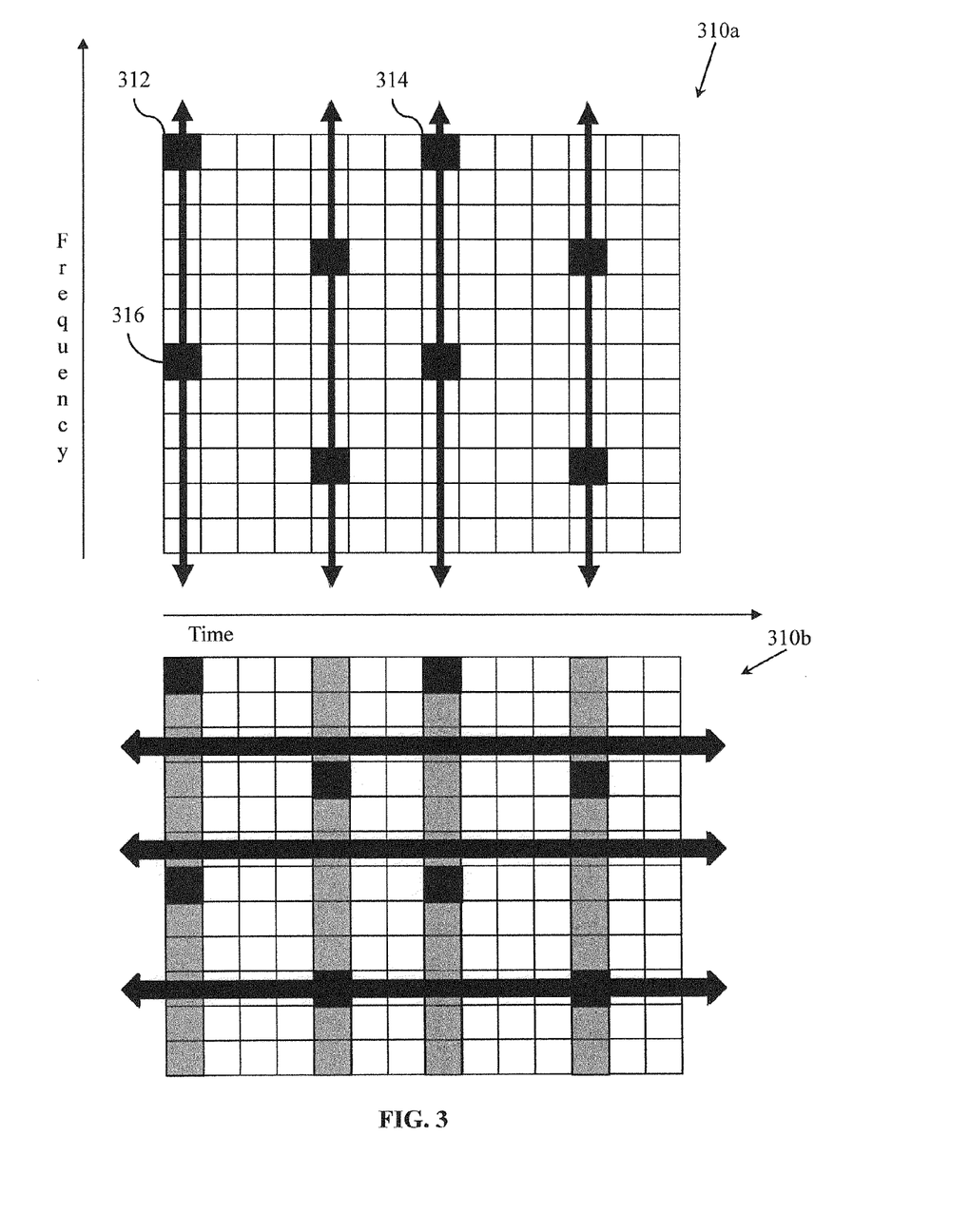
FIG. 3 illustrates one example of a transmission frame of an OFDM signal at two different points during processing.

In one embodiment, the device 100 is configured to wirelessly communicate with other devices by sending and receiving OFDM signals. An OFDM signal is a data carrier signal that includes multiple frequency sub-carriers. For example, FIG. 3 illustrates a portion or frame of an OFDM signal at two successive points (e.g., frame 310a and frame 310b) during processing.

Consider that frame 310a illustrates multiple frequency sub-carriers along the y-axis and successive points in time for the sub-carriers along the x-axis. Thus, frame 310a illustrates a representative portion of the OFDM signal for fourteen successive points in the time domain with twelve sub-carriers spaced at regular intervals in the frequency domain. A block in frame 310a illustrates an OFDM symbol (e.g., 312). An OFDM symbol is a data point in the OFDM signal.

Additionally, darkened blocks 312, 314, and 316 are examples of OFDM symbols that are part of a pilot pattern that includes other OFDM symbols throughout the OFDM signal (represented here by darkened blocks). The pilot pattern is a set of OFDM symbols known to the device 100 prior to receiving the OFDM signal.

One example of processing these signals may be as follows. A transmitting device places the symbols of the pilot pattern (also referred to herein as "pilot pattern symbols") into the OFDM signal. A receiving device (e.g., device 100) is programmed to recognize the pilot pattern and therefore knows the pilot pattern prior to receiving the transmission (e.g., pilot pattern is pre-determined and stored in memory). Thus, the values and locations of the pilot pattern symbols are known to the device 100 prior to the device 100 receiving the OFDM signal. The demodulation logic 170 (shown in FIG. 1) in the device 100 compares the values of the pilot pattern symbols in the received OFDM signal to known values of the pilot pattern symbols. In this way, the demodulation logic 170 correlates the pilot pattern in a received OFDM signal to the known pilot pattern to determine a channel response for the received OFDM signal. The channel response is, for example, the signal distorting characteristics of the communication channel that influence the OFDM signal as the OFDM signal propagates through a wireless medium from the transmitting device to the device 100.

The device 100 uses the channel response determined from the comparison of the pilot pattern values when processing the OFDM signal. The device 100 performs, for example, channel estimation on the OFDM signal to reconstruct a channel response in the OFDM signal between the pilot pattern symbols (e.g., dark blocks 312, 314, 316). In one embodiment, the channel estimation is performed by successively processing the OFDM signal in one domain at a time (e.g., frequency domain first and then time domain second). The processing includes, for example, a filtering process and/or interpolation between the pilot pattern estimates determined previously by the demodulation logic 170.

However, depending on channel conditions of the OFDM signal, processing in a static order (e.g., always frequency and then time) can be inefficient. Thus, at 220 in FIG. 2, the measurement logic 120 determines channel conditions for the OFDM signal. At 230, the channel conditions are then used to select a processing path (e.g., first processing path 150 or second processing path 160 in FIG. 1) for the OFDM signal. In this way, when the channel conditions change, the device 100 can adaptively switch processing paths to maintain efficiency in processing the OFDM signal and possibly avoid performance degradation.

With reference to FIG. 1, in one embodiment, the measurement logic 120 determines the channel conditions by measuring the channel conditions from the OFDM signal and/or the demodulated pilot symbols (i.e., the channel responses at the pilot sub-carriers) from 170. This function is performed at 220 in FIG. 2. The channel conditions are attributes of the OFDM signal. For example, the channel conditions may include a frequency correlation, a time correlation, and so on. The frequency correlation is, for example, a difference in values of pilot pattern symbols from the OFDM signal in the frequency domain. The time correlation is, for example, a difference in values of pilot pattern symbols from the OFDM signal in the time domain.

In one embodiment, the measurement logic 120 uses, for example, symbols in the OFDM signal that correlate with the pilot pattern to measure the frequency correlation and the time correlation. For example, the measurement logic 120 measures the frequency correlation from an amount of change in a value between two pilot pattern symbols in the OFDM signal in the frequency domain. Thus, by measuring a differential between pilot pattern symbols as received in the OFDM signal, channel conditions of the OFDM signal can be determined that are useful when selecting a processing path. In this way, the measurement logic 120 can determine values that are then provided to the controller 130 which determines and selects one of the processing paths 150 or 160.

Figure 4:
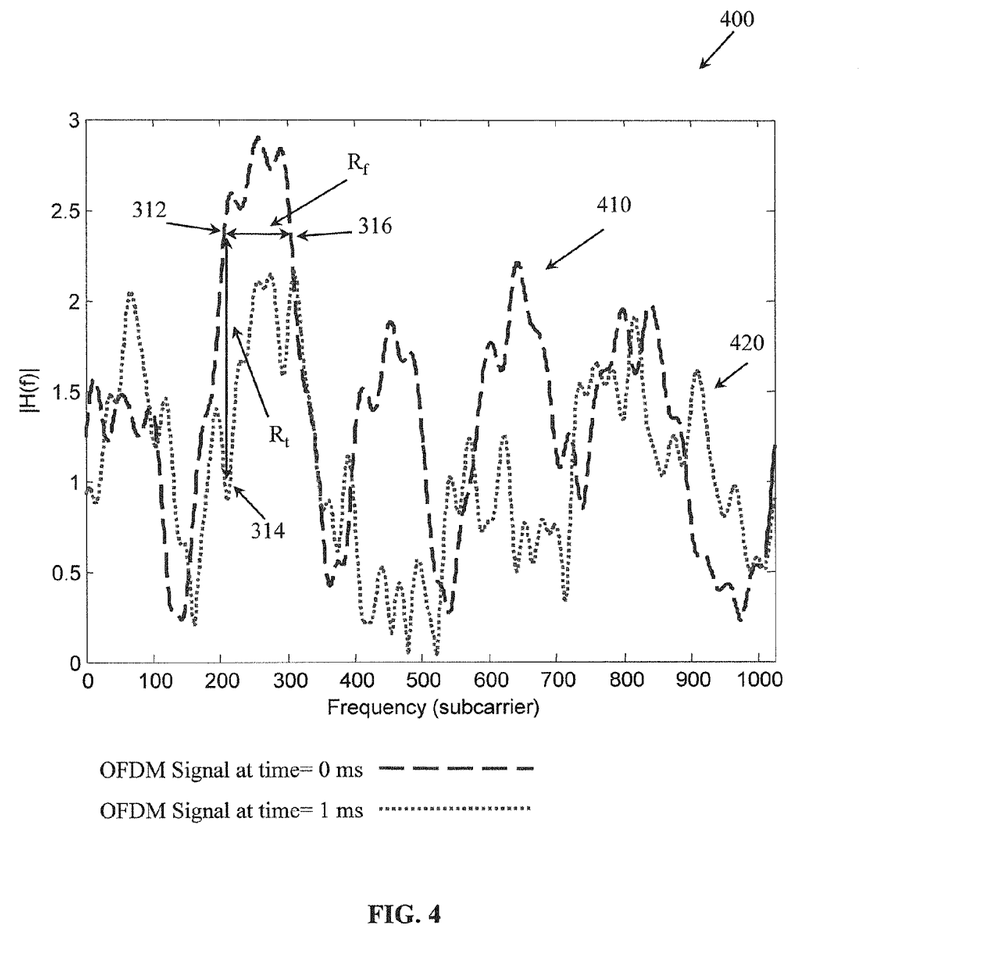
FIG. 4 illustrates one example of a received OFDM signal at two different points in time.

Consider graph 400 as shown in FIG. 4 where the channel response is illustrated at time=0 (reference line 410) and time=1 millisecond (reference line 420). In this example, both 410 and 420 are samples of channel response from the received OFDM signal that include pilot pattern symbols. Let $R_f$ represent a frequency correlation and $R_t$ represent a time correlation for the OFDM signal. In one embodiment, $R_f$ is measured between, for example, pilot pattern blocks 312 and 316 of FIG. 3 which correlate to the two points on the line 410 denoted by $R_f$ in FIG. 4. The measurement logic 120 measures the value at 312 and the value at 316 and, for example, determines a difference in the values to produce the frequency correlation $R_f$. In FIG. 4, the values for 312 and 316, for example, are the values given by $|H(f)|$ in the y-axis for a subcarrier as corresponding to a frequency specified on the x-axis. Thus, $R_f$ represents a degree of change in value of the signal between 312 and 316 (e.g., change in the frequency domain between different subcarriers).

In one embodiment, the measurement logic 120 determines the time correlation by measuring an amount of change in a value between two pilot pattern symbols in the OFDM signal in the time domain. For example, $R_t$ may be measured between pilot pattern blocks 312 and 314 of FIG. 3 which correlate with the points on the line 410 and the line 420 denoted by the vertical arrow line $R_t$ in FIG. 4. In one embodiment, the measurement logic 120 measures the value at 312 and the value at 314 and determines a difference in the values to produce the time correlation $R_t$. Thus, $R_t$ represents a degree of change in the time domain for the OFDM signal between 312 and 314 (e.g., change in the time domain between the same subcarriers).

In one embodiment, the frequency and time correlation are measured by the measurement logic 120 based on the received signal and the transmitted pilot symbols.

$$\hat{R}_f(k)=G(y_{ij}(t),s_{i_p j_p}(t)), \hat{R}_t(m)=H(y_{ij}(t),s_{i_p j_p}(t))$$

Where G( ) and H( ) are the functions of the frequency and time correlation measurement.

One example of how the measurement logic 120 may determine $R_f$ and $R_t$ is given by:

$$R_f(k) = \frac{1}{N_f} \sum_{i_p,j_p} \frac{(y_{i_p j_p} s^*_{i_p j_p}) \times (y_{i_p(j_p+k\Delta f)} s^*_{i_p(j_p+k\Delta f)})^*}{|y_{i_p j_p} s^*_{i_p j_p}| \times |y_{i_p(j_p+k\Delta f)} s^*_{i_p(j_p+k\Delta f)}|};$$

$\Delta f$ : pilot *freq* spacing $$R_t(m) = \frac{1}{N_t} \sum_{i_p,j_p} \frac{(y_{i_p j_p} s^*_{i_p j_p}) \times (y_{(i_p+m\Delta t)j_p} s^*_{(i_p+m\Delta t)j_p})^*}{|y_{i_p j_p} s^*_{i_p j_p}| \times |y_{(i_p+m\Delta t)j_p} s^*_{(i_p+m\Delta t)j_p}|};$$

$\Delta t$ : pilot time spacing $y_{ij}$ is the received signal at the $j^{th}$ frequency subcarrier in the $i^{th}$ OFDM symbol.

$Si_p j_p$ is the pilot symbol at the $j_p^{th}$ subcarrier in the $i_p^{th}$ OFDM symbol.

i denotes the correlation measurement time window and j denotes the correlation measurement frequency band.

$(i_p, j_p)$ represents the pilot location within the correlation measurement region.

m and k represent a distance between two pilot pattern symbols that are compared to measure the frequency correlation or the time correlation in the frequency or the time domain, in unit of subcarriers or symbols.

$N_f$ is the total number of measurements of frequency correlation in the measurement band.

$N_t$ is the total number of measurements of time correlation in the measurement window.

The measurement logic 120 may determine $R_f$ and $R_t$ for a plurality of points within the signal to provide more data points when deciding which processing path to select. Additionally, in one embodiment, the measurement logic 120 monitors the OFDM signal to iteratively determine the channel conditions. Thus, the measurement logic 120 maintains, for example, short term values of $R_t$ and $R_f$ and/or long term values of for $R_t$ and $R_f$. In one example, the averages may be maintained across transmission frames for the OFDM signal.

In one embodiment, the averaged correlations are represented by:

$$\hat{R}_f(k;t)=G(y_{ij}(t),s_{i_p j_p}(t), \hat{R}_t(m;t)=H(y_{ij}(t),s_{i_p j_p}(t))$$

$$R_f(k;t)=Q(\hat{R}_f(k;\tau);\tau=0 \ldots t), R_t(m;t)=P(\hat{R}_t(m;\tau);\tau=0 \ldots t)$$

For example, the long term values can be obtained by a one-pole IIR filter, or a moving average for the frequency correlation as represented by, for example:

$$R_f(k; t) = (1 - \alpha)\hat{R}_f(k; t) + \alpha R_f(k; t-1)$$

$$R_f(k; t) = \frac{1}{L}\sum_{l=0}^{L-1} \hat{R}_f(k; t-l)$$

$\alpha$ represents the forgetting factor of the one-pole IIR filter, and L is the size of the moving average window.

In one embodiment, the determined channel conditions are provided by the measurement logic 120 to the controller 130. While $R_f$ and $R_t$ are discussed, it should be appreciated that other channel conditions for the OFDM signal may be measured and provided to the controller 130 for use in determining which processing path to select.

With reference again to FIG. 1, the controller 130 determines which processing path to use and controls the switch 140 to select between the first processing path 150 or the second processing path 160. The controller 130 uses, for example, the channel conditions from the measurement logic 120 to determine which processing path (e.g., 150 or 160) to select. For example, consider the channel conditions from FIG. 4. The frequency correlation is high since 312 and 316 are close in value as illustrated in FIG. 4 (e.g., 2.4−2.4=0 where H(f) represents a value of an associated subcarrier). Thus, processing in the frequency domain first is an efficient choice since the change in the frequency domain is low. However, selecting the time domain first for processing in this example would not be an efficient choice since the time correlation value between 312 and 314 is large in comparison to the frequency correlation (e.g., 2.4−=1.4). Therefore, selecting the time domain first would likely result in performance degradation.

Accordingly, at 230 in FIG. 2, with the channel conditions determined, method 200 selects the first processing path 150 and proceeds to 240 where the first processing path 150 first processes the OFDM signal in the frequency domain and then, at 250, the method processes the signal in the time domain. Method 200 then returns to 210 where a new frame for the OFDM signal is received for processing and the method continues.

One example of processing the signal via the first processing path 150 is illustrated in FIG. 3. For example, frame 310a illustrates processing of a transmission frame of the OFDM signal in the frequency domain. To perform one-dimensional frequency domain processing, the first processing path 150, for example, interpolates values for OFDM symbols in columns (e.g., y-axis) with pilot pattern symbols as illustrated by the arrows. In this way, values between the known pilot pattern symbols are determined.

After performing the frequency domain processing, logic in the first processing path 150 performs time domain processing on the partially interpolated frame 310b. Logic in the first processing path 150 is configured to interpolate symbols in the frame 310b in the time domain (x-axis) between the values previously interpolated during frequency domain processing. Subsequent frames from the OFDM signal are processed similarly.

Alternatively, if the channel conditions indicate a low frequency correlation relative to the time correlation, the controller 130 controls the switch 140 to select the second processing path 160. Thus, the OFDM signal is processed with logic configured to perform time domain processing first and then perform frequency domain processing second. The second processing path 160 performs time domain processing by, for example, interpolating symbols in rows (e.g., x-axis) with pilot pattern symbols. After performing the time domain processing, the second processing path 160 performs frequency domain processing on the partially interpolated frame. In this example, the second processing path 160 interpolates symbols in the frame in the frequency domain (y-axis) between the values previously interpolated during time-domain processing. This processing scenario is represented by FIG. 2 at decision 230, where the process proceeds to time domain processing at 260 and then frequency domain processing at 270.

In another embodiment, instead of selecting between processing paths at 230, method 200 includes, for example, performing multiple determinations to determine which processing path to select. For example, with reference to FIG. 5, one embodiment of block 230 of method 200 is illustrated that includes decision blocks 510 and 520. In this example, at 510, the method determines whether the frequency correlation from the measurement logic 120 is within a predetermined frequency threshold. If the frequency correlation $R_f$ for the OFDM signal is, for example, larger than the predetermined frequency threshold then the OFDM signal is processed by the first processing path 150 as indicated at 240.

However, if the frequency correlation $R_f$ is not within (i.e., larger than) the predetermined frequency threshold, then the method proceeds to 520. At 520, the method determines whether the time correlation $R_t$ for the OFDM signal is within a predetermined time threshold. If the time correlation $R_t$ is within the predetermined time threshold, the second processing path 160 is selected and the method proceeds to 260 where the signal is processed in the time domain first. However, if the time correlation $R_t$ is not within the predetermined time threshold, then the first processing path 150 is selected and the method proceeds to 240 where the signal is processed in the frequency domain first. In one embodiment, the controller 130 of FIG. 1 is configured to perform the actions at 510 and 520 of FIG. 5.

Figure 5:
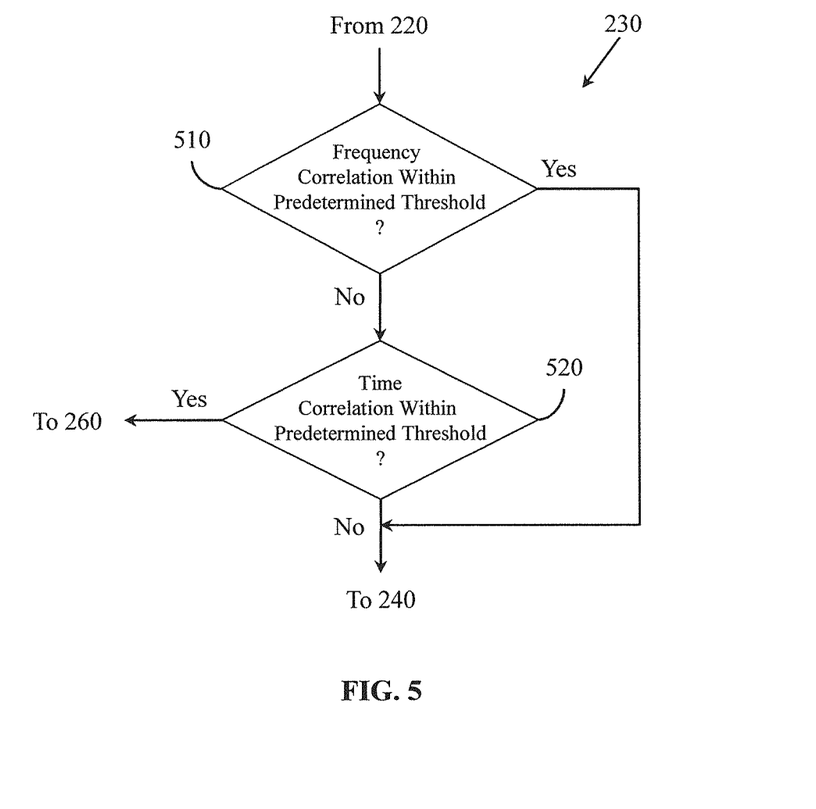
FIG. 5 illustrates one embodiment of a method for determining which processing path to select for processing the OFDM signal.

Furthermore, instead of defaulting to the first processing path 150 after 520, in one embodiment, method 200 continues by using channel conditions measured between pilot pattern symbols spaced further apart with a second set of thresholds to determine a processing path. For example, instead of calculating $R_f$ between 312 and 316, $R_f$ may be calculated between 312 and a pilot pattern symbol that is an additional interval away (e.g., an additional 6 blocks in frequency from 316). Thus, measurement logic 120 measures a second frequency correlation $R_{f2}$ at 220 in FIG. 2 between pilot pattern symbols that are, for example, 12 blocks apart. Thus, if the determination at 520 in FIG. 5 is no, then method 200 proceeds to determine whether the second frequency correlation $R_{f2}$ is within a second predetermined frequency threshold. If the second frequency correlation $R_{f2}$ is within the second predetermined frequency threshold, then method 200 proceeds to 240.

If the second frequency correlation $R_{f2}$ is not within the second predetermined frequency threshold, then method 200 proceeds to determine whether a second time correlation $R_{t2}$ (also determined at 220) is within a second predetermined time correlation threshold. If the second time correlation $R_{t2}$ is within the second predetermined time threshold, then method 200 proceeds to 260, otherwise method 200 defaults to 240. In this way, method 200 may avoid defaulting to the first processing path 150 and proceed to 240 when an additional determination may prevent performance degradation by facilitating selection of a better path. In other embodiments more iterations of blocks 510 and 520 may be performed to facilitate improving the selection of a processing path.

Figure 6:
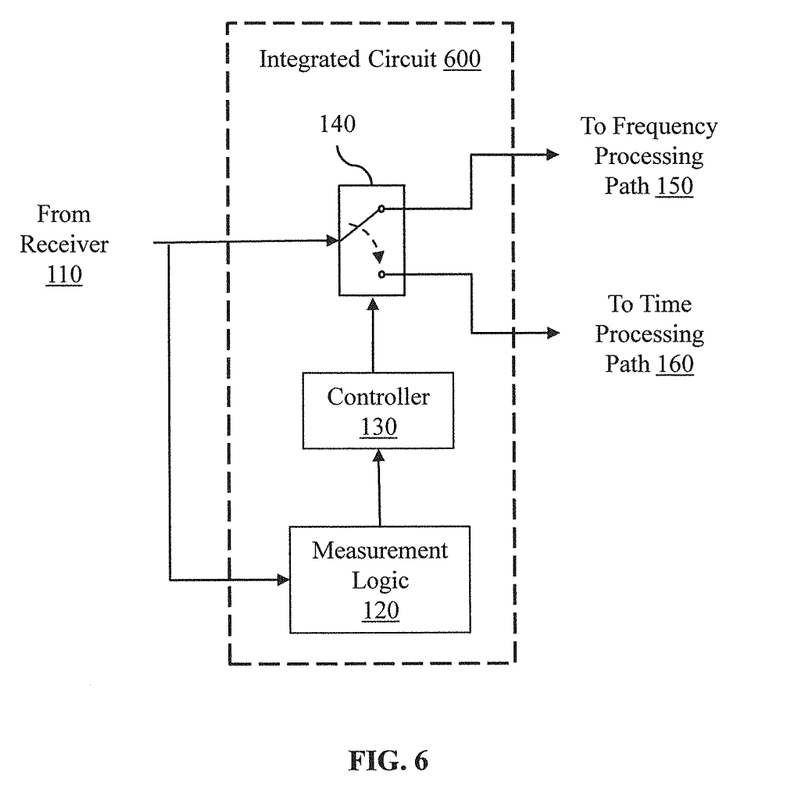
FIG. 6 illustrates one embodiment of an integrated circuit associated with switching processing paths when performing adaptive low-complexity channel estimation.

With reference to FIG. 6, one embodiment of an integrated circuit 600 associated with switching processing paths when performing adaptive low-complexity channel estimation is illustrated. FIG. 6 illustrates an embodiment of the integrated circuit 600 that includes the measurement logic 120, the controller 130, and the switch 140 of FIG. 1. The integrated circuit 600, for example, connects to the receiver 110, the first processing path 150, and the second processing path 160 that are included on circuits separate from the integrated circuit 600. In one example, the processing paths 150 and 160 are separate circuits configured to perform the successive one-dimensional processing of the OFDM signal in different orders. The processing paths 150, 160 are, for example, logics for performing successive one-dimensional processing of the OFDM signal. Thus, in one embodiment, the integrated circuit 600 may control a path taken by an OFDM signal from the receiver 110 to different downstream circuits via first processing path 150 or second processing path 160.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A device, comprising:
a receiver configured to receive an orthogonal frequency-division multiplexed (OFDM) signal;
a measurement logic configured to determine channel conditions of the OFDM signal; and
a controller configured to control a switch to select a processing path from a plurality of processing paths based, at least in part, on the channel conditions of the OFDM signal, wherein the plurality of processing paths at least include:
a first processing path that includes logic for first performing one-dimensional frequency domain processing and then subsequently performing one-dimensional time domain processing of the OFDM signal;
a second processing path that includes logic for first performing one-dimensional time domain processing and then subsequently performing one-dimensional frequency domain processing of the OFDM signal; and
wherein each of the first processing path and the second processing path is configured to perform channel estimation processing on the OFDM signal.

2. The device of claim 1, wherein:
the measurement logic is configured to determine the channel conditions of the OFDM signal using a pilot pattern from the OFDM signal.

3. The device of claim 2, wherein the measurement logic is further configured to monitor the OFDM signal to iteratively determine the channel conditions of the OFDM signal.

4. The device of claim 1, wherein the device is a wireless communications device that is compatible with IEEE 802.16, WiMAX, LTE, or IEEE 802.11 or a wired communications device that is compatible with Digital Subscriber Line (DSL) and wherein the device is a smartphone, a handheld device, a DSL modem, or a wireless network interface card.

5. The device of claim 2, wherein the channel conditions include at least a frequency correlation and a time correlation for the OFDM signal.

6. A device, comprising:
a receiver configured to receive an orthogonal frequency-division multiplexed (OFDM) signal;
a measurement logic configured to determine channel conditions of the OFDM signal; and
a controller configured to control a switch to select between a plurality of processing paths based, at least in part, on the channel conditions of the OFDM signal, wherein the controller is further configured to:
select a first processing path if a frequency correlation for the OFDM signal is within a predetermined frequency threshold, and
select a second processing path if i) a time correlation for the OFDM signal is within a predetermined time threshold, and ii) the frequency correlation is not within the predetermined frequency threshold.

7. A method, comprising:
receiving an orthogonal frequency-division multiplexed (OFDM) signal in a communication device;
determining channel conditions from the OFDM signal;
controlling the communication device to select one of a plurality of processing paths for performing successive one-dimensional processing of the OFDM signal based, at least in part, on the channel conditions of the OFDM signal,
wherein controlling the communication device to select between the plurality of processing paths includes selecting a first processing path if a frequency correlation for the OFDM signal is within a predetermined frequency threshold, and selecting a second processing path if i) a time correlation for the OFDM signal is within a predetermined time threshold, and ii) the frequency correlation is not within the predetermined frequency threshold, and wherein the frequency correlation and the time correlation are channel attributes of the OFDM signal.

8. A method, comprising:
receiving an orthogonal frequency-division multiplexed (OFDM) signal in a communication device;
determining channel conditions from the OFDM signal;
controlling the communication device to select one of a plurality of processing paths for performing successive one-dimensional processing of the OFDM signal based, at least in part, on the channel conditions of the OFDM signal, wherein controlling the communication device to select between the plurality of processing paths includes selecting between a first processing path to process the OFDM signal first in the frequency domain and then subsequently process the OFDM signal in the time domain, and a second processing path to process the OFDM signal first in the time domain and then subsequently process the OFDM signal in the frequency domain, and
wherein the first processing path and the second processing path perform channel estimation processing on the OFDM signal.

9. The method of claim 8, further comprising:
monitoring the OFDM signal to iteratively determine the channel conditions of the OFDM signal.

10. The method of claim 8, wherein the communication device is compatible with IEEE 802.16, WiMAX, LTE, IEEE 802.11, or Digital Subscriber Line (DSL), and wherein the communication device is a smartphone a handheld device, a wireless network interface card, or a DSL modem.

11. The method of claim 8, wherein:
determining the channel conditions includes using a pilot pattern from the OFDM signal.

12. The method of claim 11, wherein the channel conditions include at least a frequency correlation and a time correlation for the OFDM signal.

13. An integrated circuit, comprising:
a receiver configured to receive an orthogonal frequency-division multiplexed (OFDM) signal to be processed according to a successive one-dimensional processing path;
a measurement logic configured to determine channel conditions of the OFDM signal;
a controller configured to control a switch to select one of a plurality of processing paths based, at least in part, on the channel conditions of the OFDM signal, wherein the plurality of processing paths include at least:
i) a first processing path configured to process the OFDM signal first in a frequency domain and then subsequently process the OFDM signal in a time domain, and
ii) a second processing path configured to process the OFDM signal first in the time domain and then subsequently process the OFDM signal in the frequency domain, and
wherein each of the first processing path and the second processing path is configured to perform channel estimation processing on the OFDM signal.

14. The integrated circuit of claim 13, wherein:
the measurement logic is configured to determine the channel conditions of the OFDM signal using a pilot pattern from the OFDM signal, wherein the channel conditions include at least a frequency correlation and a time correlation for the OFDM signal.

15. The integrated circuit of claim 14, wherein the measurement logic is further configured to monitor the OFDM signal to iteratively determine the channel conditions of the OFDM signal as frames of the OFDM signal are received.

16. The integrated circuit of claim 13, wherein the integrated circuit is compatible with IEEE 802.16, WiMAX, LTE, IEEE 802.11, or Digital Subscriber Line (DSL) and wherein the integrated circuit is embedded within a smartphone, a handheld device, a wireless network interface card, or a DSL modem.

17. An integrated circuit, comprising:
a receiver configured to receive an orthogonal frequency-division multiplexed (OFDM) signal to be processed according to a successive one-dimensional processing path;
a measurement logic configured to determine channel conditions of the OFDM signal;
a controller configured to control a switch to select one of a plurality of processing paths based, at least in part, on the channel conditions of the OFDM signal, wherein the controller is further configured to:
select a first processing path if a frequency correlation for the OFDM signal is within a predetermined frequency threshold, and to select a second processing path if i) a time correlation for the OFDM signal is within a predetermined time threshold, and ii) the frequency correlation is not within the predetermined frequency threshold.

* * * * *